US009821863B2

United States Patent
Vasilescu

(10) Patent No.: US 9,821,863 B2
(45) Date of Patent: Nov. 21, 2017

(54) BLUFF BODY ADAPTIVE WAKE REDUCTION SYSTEM

(71) Applicant: American Dynamics Flight Systems, Inc., Jessup, MD (US)

(72) Inventor: Paul Vasilescu, West New York, NJ (US)

(73) Assignee: American Dynamics Flight Systems, Inc., Jessup, MD (US)

( * ) Notice: Subject to any disclaimer, the term of this patent is extended or adjusted under 35 U.S.C. 154(b) by 0 days.

(21) Appl. No.: 15/270,697

(22) Filed: Sep. 20, 2016

(65) Prior Publication Data
US 2017/0008577 A1    Jan. 12, 2017

Related U.S. Application Data

(63) Continuation of application No. PCT/IB2015/052037, filed on Mar. 19, 2015.

(60) Provisional application No. 61/955,797, filed on Mar. 20, 2014.

(51) Int. Cl.
B62D 35/00    (2006.01)

(52) U.S. Cl.
CPC .................................. B62D 35/001 (2013.01)

(58) Field of Classification Search
CPC .... B62D 35/00; B62D 35/001; B62D 35/002; B62D 35/007; B62D 35/02
USPC .......................................... 296/180.1, 180.4
See application file for complete search history.

(56) References Cited

U.S. PATENT DOCUMENTS

| 3,010,754 | A | * | 11/1961 | Shumaker | B60J 1/2002 296/91 |
| 3,997,797 | A | * | 12/1976 | Sahara | H03D 3/08 327/39 |
| 4,320,920 | A | * | 3/1982 | Goudey | B62D 35/001 296/180.4 |
| 5,171,057 | A | * | 12/1992 | Sharp | B62D 35/001 296/180.4 |
| 5,280,990 | A | * | 1/1994 | Rinard | B62D 35/001 296/180.1 |
| 6,241,302 | B1 | * | 6/2001 | Rehkopf | B60J 1/2008 296/152 |

(Continued)

OTHER PUBLICATIONS

International Search Report and Written Opinion dated Jul. 24, 2015 in International Application No. PCT/IB2015/052037.

*Primary Examiner* — Gregory Blankenship
(74) *Attorney, Agent, or Firm* — Baker Botts L.L.P.

(57) ABSTRACT

A bluff body adaptive wake reduction system includes a series of fairings mounted to outer surfaces of the aft end of the road vehicle. The fairings are streamlined in geometry with an outer surface, a partially hollow core, and with a rear end surface curved such that left and right hand sides are convergent behind the vehicle. The fairings are coupled to at least one ram air inlet and also include at least one blown slot positioned on the rear end of the fairings enabling air flow to exit the fairings tangent to the rear end surface of the fairings. Air flow enters the system through the ram air inlets and exits through the blown slots. Air flow exiting the blown slots promotes flow traveling over the outer surface to remain attached to the outer surface and thus to the rear end surface. The rear end surface then deflects air flow to follow a convergent trajectory behind the vehicle in such a fashion as to reduce the size of the wake, and as a result reduce the aerodynamic drag.

20 Claims, 5 Drawing Sheets

(56) References Cited

U.S. PATENT DOCUMENTS

| | | | | |
|---|---|---|---|---|
| 6,685,256 B1* | 2/2004 | Shermer | B60J 5/108 | 296/180.1 |
| 6,779,834 B1* | 8/2004 | Keller | B62D 35/001 | 296/180.4 |
| 6,932,419 B1* | 8/2005 | McCullough | B62D 35/001 | 296/180.1 |
| 7,192,077 B1* | 3/2007 | Hilleman | B62D 35/001 | 296/180.1 |
| 8,091,951 B1* | 1/2012 | Fitzgerald | B62D 35/001 | 296/180.1 |
| 8,196,996 B1* | 6/2012 | Campbell | B62D 35/001 | 296/180.1 |
| 2003/0038508 A1* | 2/2003 | Fairburn | B62D 35/001 | 296/208 |
| 2006/0001292 A1* | 1/2006 | Shahbazi | B62D 35/00 | 296/180.1 |
| 2006/0103167 A1* | 5/2006 | Wong | B62D 35/001 | 296/180.1 |
| 2007/0013209 A1* | 1/2007 | Neuburger | G01C 21/26 | 296/180.4 |
| 2007/0187990 A1* | 8/2007 | Shahbazi | B62D 37/02 | 296/180.1 |
| 2009/0096248 A1* | 4/2009 | Moscoso Gomez | B62D 35/007 | 296/180.1 |
| 2009/0212598 A1* | 8/2009 | Otterstrom | B62D 35/001 | 296/181.5 |
| 2011/0095564 A1* | 4/2011 | Chen | B62D 35/001 | 296/180.4 |
| 2011/0095565 A1* | 4/2011 | Chen | B62D 35/001 | 296/180.4 |
| 2011/0095566 A1* | 4/2011 | Chen | B62D 35/001 | 296/180.4 |
| 2011/0148142 A1* | 6/2011 | Kint | B62D 35/02 | 296/180.4 |
| 2013/0076068 A1* | 3/2013 | Wayburn | B62D 35/004 | 296/180.4 |
| 2013/0106135 A1* | 5/2013 | Praskovsky | B62D 35/001 | 296/180.1 |
| 2015/0225025 A1* | 8/2015 | Habershon | B62D 35/001 | 296/180.1 |
| 2016/0031496 A1* | 2/2016 | Zha | B62D 35/00 | 296/180.1 |
| 2016/0052566 A1* | 2/2016 | Bacon | B62D 35/001 | 296/180.4 |
| 2017/0008577 A1* | 1/2017 | Vasilescu | B62D 35/001 | |

* cited by examiner

BLUFF BODY ADAPTIVE WAKE REDUCTION SYSTEM

CROSS REFERENCE TO RELATED APPLICATIONS

This application is a continuation of International Patent Application No. PCT/IB2015/052037, filed Mar. 19, 2015, which claims priority to U.S. Provisional Patent Application Ser. No. 61/955,797, filed on Mar. 20, 2014, which are each incorporated herein by reference in their entireties and from which priority is claimed.

BACKGROUND

Technical Field

The present invention relates generally to aerodynamic drag reducing devices for road vehicles and, more particularly, a bluff body adaptive wake reduction system.

SUMMARY

The wake reduction system disclosed is an aerodynamic drag reduction device designed to reduce aerodynamic drag of road vehicles with bluff bodies.

In an embodiment, the bluff body adaptive wake reduction system includes: a pair of side fairings mounted to the left and right hand sides of a road vehicle near the rear end, that are streamlined in geometry, with an outer surface, a partially hollow core, and with a rear end surface curved such that left and right hand sides are convergent behind the vehicle. The bluff body adaptive wake reduction system also includes a single or plurality of ram air inlets, a single or plurality of blown slots positioned on the rear end of the side fairings enabling air flow to exit the side fairings tangent to the rear end surface of the fairings. The bluff body adaptive wake reduction system also includes internal flow passages connecting the ram air inlet or inlets to the blown slots. The bluff body adaptive wake reduction system may also include a top fairing positioned on the top surface of the road vehicle near the rear end similarly configured to the side fairings. The bluff body adaptive wake reduction system may also include a plurality of ram air inlets that are arranged such that one or more left hand side inlets are connected to the left hand fairing through flow passages and one or more right hand side inlets are connected to the right hand fairing through flow passages. The bluff body adaptive wake reduction system may also include a plurality of ram air inlets that are arranged such that one or more left hand side inlets are connected to the right hand fairing through flow passages and one or more right hand side inlets are connected to the left hand fairing through flow passages.

In the first configuration for the bluff body adaptive wake reduction system, air flow enters the ram air inlet, or inlets, located between the bottom surface of the vehicle and the ground, or along the top surface of the vehicle, and positioned in such an arrangement to enable the capture of ram air from a range of oncoming flow angles. Air flow is then redirected through a series of flow passages between the inlet, or inlets, and the cores of side fairings. Air flow then travels through the core of the side fairings and is redirected to the blown slots positioned along the rear end surface of the side fairings. Air flow then exits the blown slots. Flow exiting the slots promotes flow traveling over the outer surface to remain attached to the outer surface and thus to the rear end surface. The rear end surface then deflects air flow to follow a convergent trajectory between the left and right hand sides behind the vehicle in such a fashion as to reduce the size of the wake, and as a result reduce the aerodynamic drag. The attachment of flow long the outer surface and rear end surface increases the effectiveness of the system across a wide range of operating conditions characterized by varying oncoming air flow vector directions.

In the second configuration, the overall arrangement and operation is identical to the first configuration but also includes a single or plurality of ram air inlets arranged along the front of the side fairings that are also coupled to the blown slots through a series of flow passages.

In the third configuration, the overall arrangement and operation is identical to the first configuration but also includes a top fairing similar in arrangement and operation to the side fairings, but mounted to the top surface of vehicle.

In the fourth configuration, the overall arrangement and operation is identical to the second configuration but also includes a top fairing similar in arrangement and operation to the side fairings, but mounted to the top surface of vehicle.

BRIEF DESCRIPTION OF THE DRAWINGS

Embodiments of the present invention will now be described more fully with reference to the accompanying drawings, where like reference numbers indicate similar structure.

DETAILED DESCRIPTION

Figure 1:
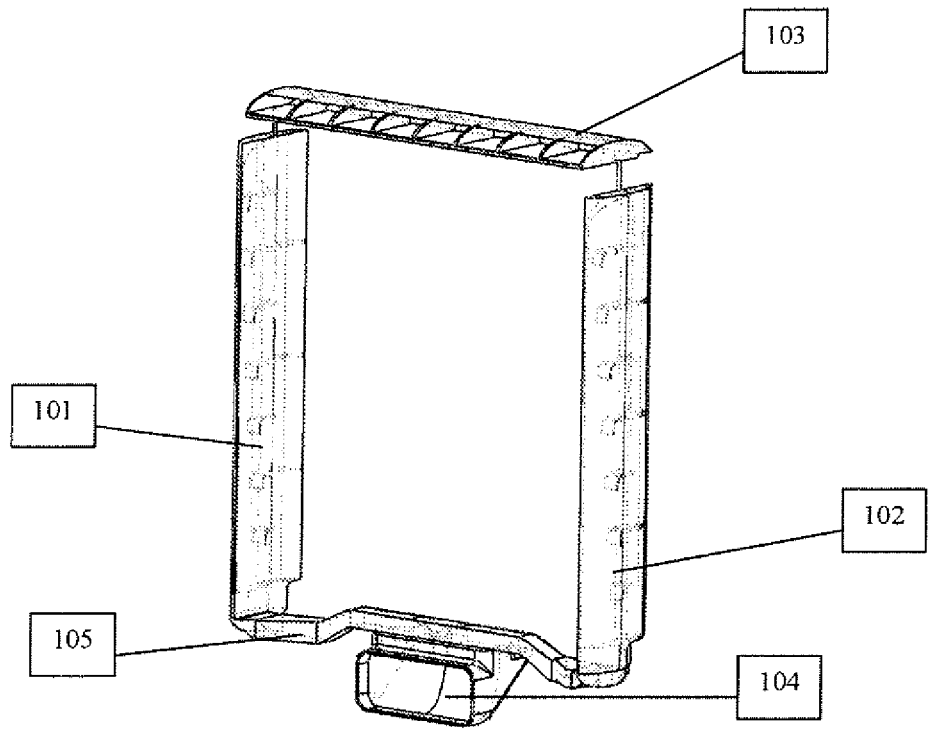
FIG. 1 is a representation of an embodiment of a bluff body adaptive wake reduction system with a single ram air inlet positioned along the bottom of the system, and a top fairing with ram air inlets on the front of the top fairing.
Figure 2:
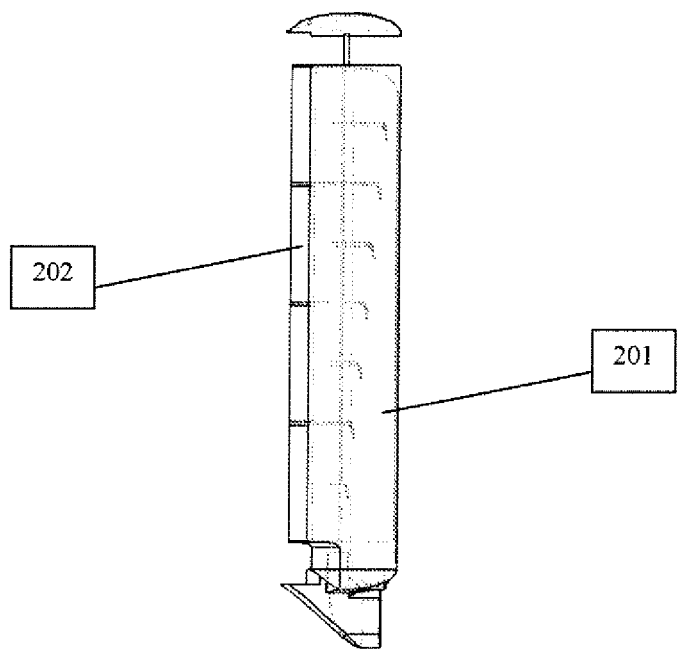
FIG. 2 is side view representation of the bluff body adaptive wake reduction system represented in FIG. 1.
Figure 3:
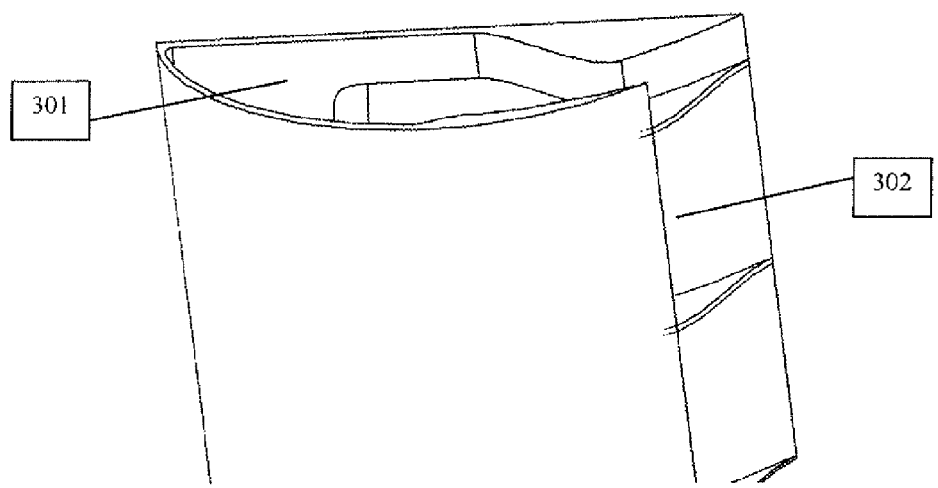
FIG. 3 is a section view representation of left hand side fairing of the bluff body adaptive wake reduction system represented in FIG. 1, with internal flow passages visible.

FIG. 1 shows a schematic representation of a bluff body adaptive wake reduction system in accordance with an embodiment of the present invention. The bluff body adaptive wake reduction system is an aerodynamic device designed to reduce aerodynamic drag of road vehicles. The system includes a right hand side fairing 101, a left hand side fairing 102, an optional top fairing 103, a single or plurality of ram air inlet(s) 104, and flow passages 105. The left and right hand side fairings further include an outer surface 201 and rear surface 202 as shown in FIG. 2. Air flow enters the system through ram air inlet 104, and is redirected to the right hand fairing 101 and the left hand fairing 102 through flow passage 105. Air flow is then directed through the core of the left and right hand side fairings through internal flow passage of the side fairings 301 to the blown slots 302 as shown in FIG. 3. Air flow then exits the blown slots 302. Flow exiting the blown slots 302 promotes flow traveling over the outer surface 201 to remain attached to the outer surface and thus to the rear end surface 202. The rear end surface deflects air flow to follow a convergent trajectory between the left and right hand sides behind the vehicle in such a fashion as to reduce the size of the wake, and as a result reduce the aerodynamic drag.

In an embodiment, as illustrated in FIG. 1, a single ram air inlet 104 is connected to side fairings 101 and 102 through flow passages 105 and thus supplies the air flow to both the left and right hand sides, agnostic of flow vector direction.

Figure 4:
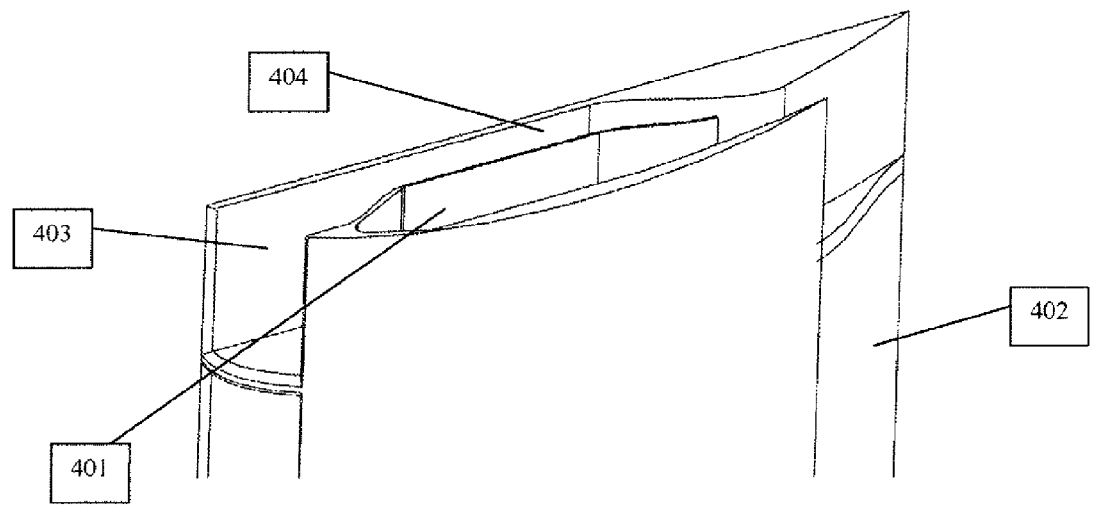
FIG. 4 is a section view representation of left hand side fairing of an embodiment of the bluff body adaptive wake reduction system, with internal flow passages visible. The bluff body adaptive wake reduction system of FIG. 4 also includes ram air inlets on the front of the side fairings.
Figure 5:
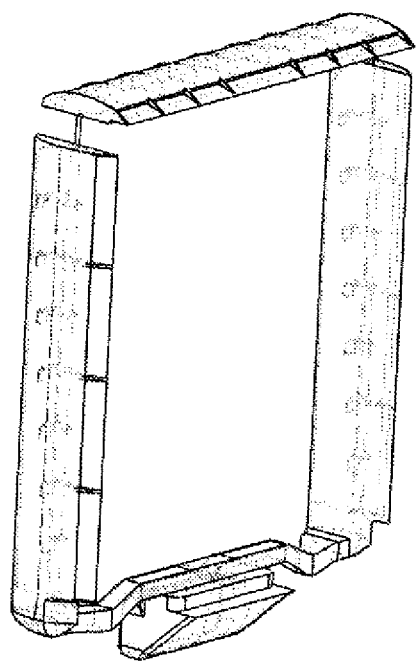
FIG. 5 is an alternate view of the bluff body adaptive wake reduction system of FIG. 1.

In another embodiment, as illustrated in FIG. 4, air flow is provided to the blown slots 402 by a combination of air flow moving up the core of the side fairing 401 and by ram air inlet(s) 403 connected to blown slots 402 by internal flow passage 404.

Figure 6:
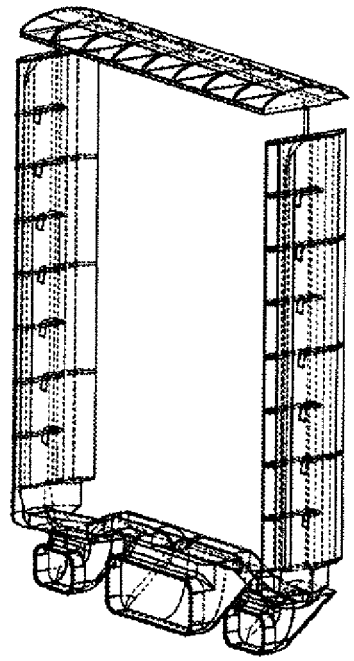
FIG. 6 is a representation of the bluff body adaptive wake reduction system of FIG. 4 with a plurality of ram air inlets located along the bottom of the system.
Figure 7:
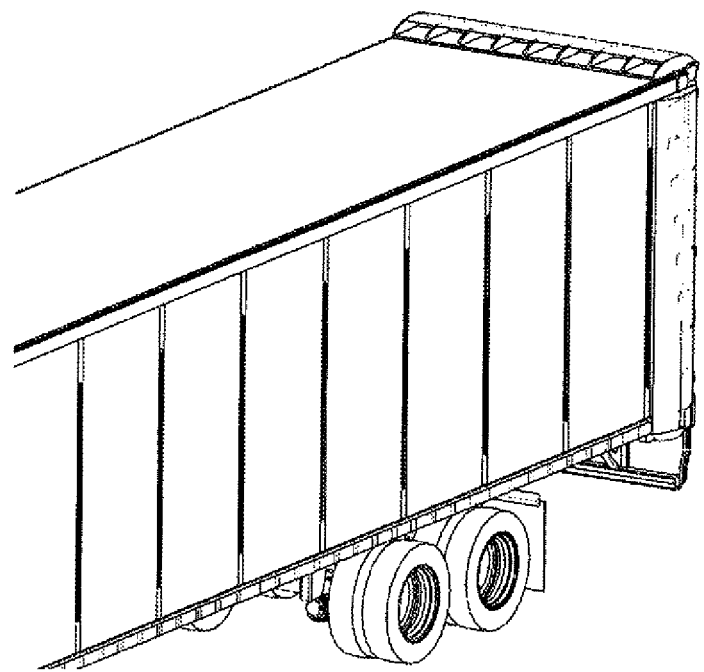
FIG. 7 is a representation of the bluff body adaptive wake reduction system of FIG. 1 installed on a trailer.
Figure 8:
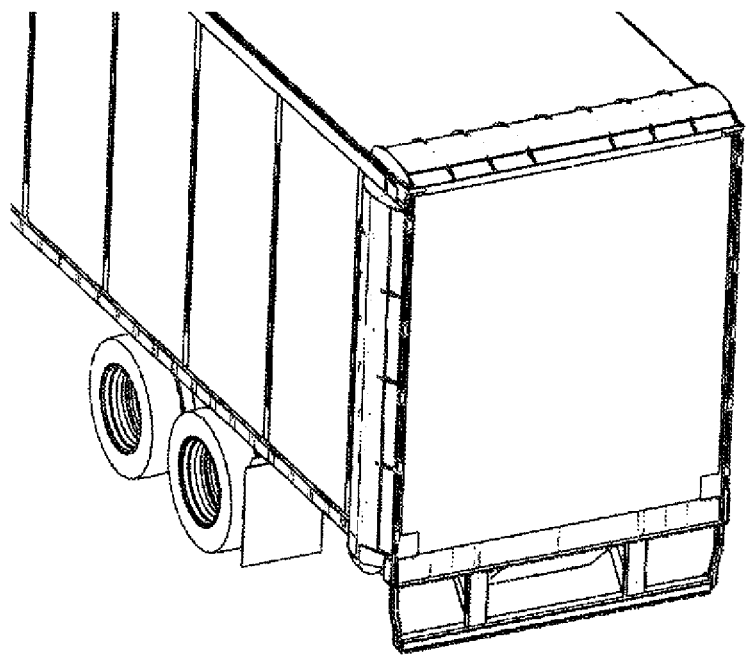
FIG. 8 is a representation of the bluff body adaptive wake reduction system of FIG. 1 installed on a trailer.
Figure 9:
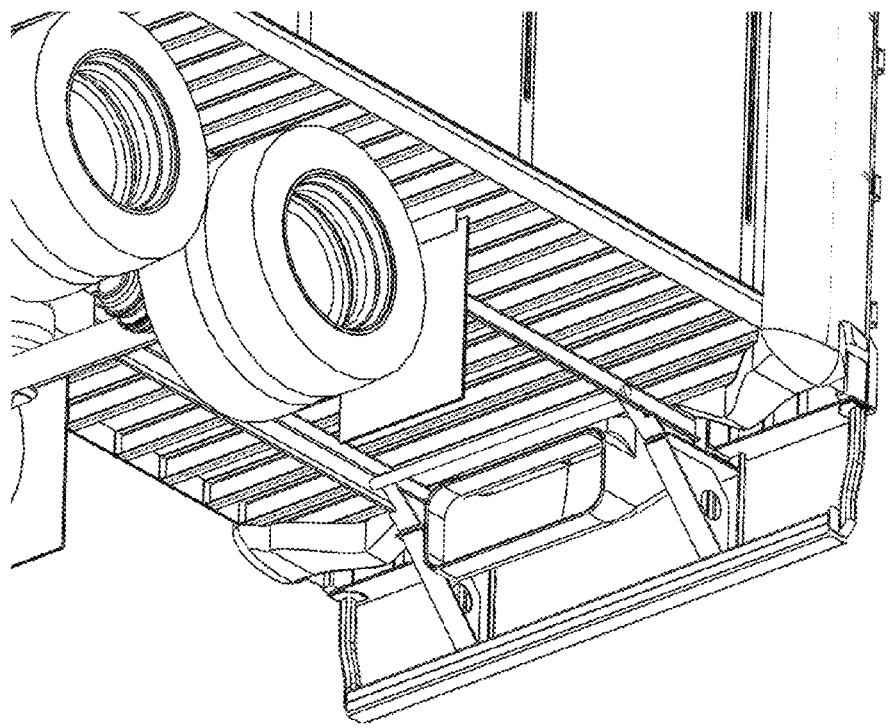
FIG. 9 is a representation of the bluff body adaptive wake reduction system of FIG. 1 installed on a trailer.
Figure 10:
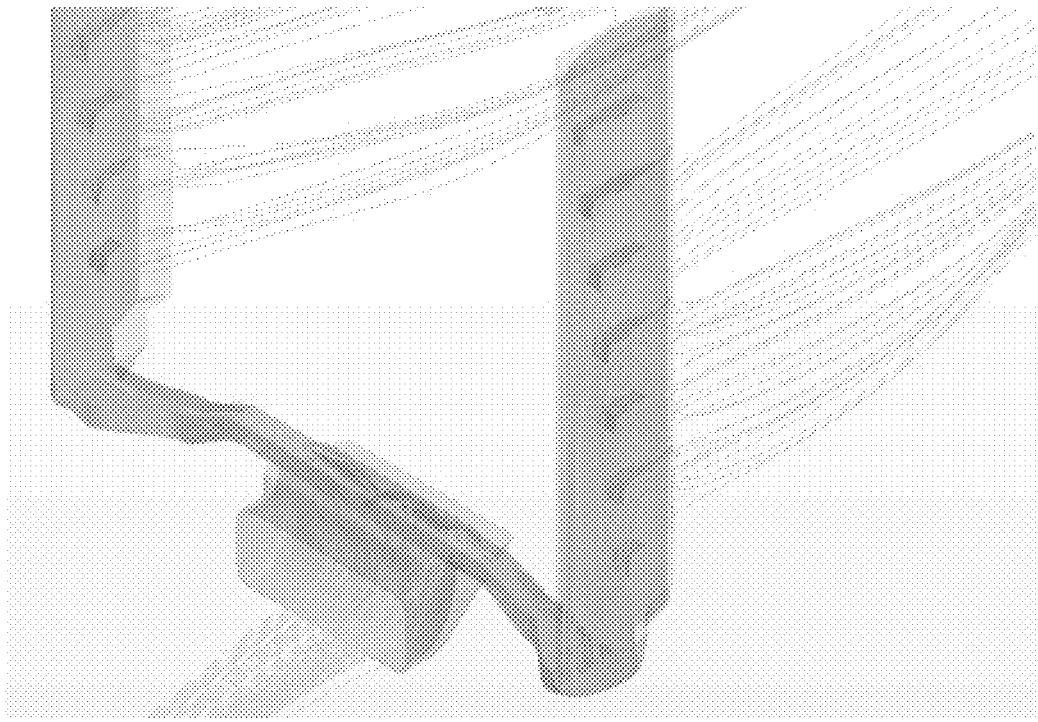
FIG. 10 is a representation of the bluff body adaptive wake reduction system of FIG. 1 with air flow streamlines illustrated.

In another embodiment, as illustrated in FIG. 6, a plurality of ram air inlets are connected to the side fairings such that air flow is supplied to the left hand side and right hand side fairings from any or all of the ram air inlets.

While the bluff body adaptive wake reduction system implementations as herein disclosed and shown through the figures are fully capable of obtaining the objects and providing the advantages a bluff body adaptive wake reduction system, they are merely illustrative of the presently preferred embodiments of the invention, and as such, no limitations are intended to the details of construction or design herein shown. Further, while the embodiments have been described with a combination of side fairings and a top fairing, one skilled in the art would recognize that a bluff body adaptive wake reduction system consisting of a single or any combination of these fairings may be utilized. Further, while the embodiments have been described with ram air inlets positioned on the bottom of the system, one skilled in the art would recognize that a bluff body adaptive wake reduction system incorporating ram air inlets located along the top of the system, or any other appropriate location as required by the application may be utilized.

What is claimed is:

1. An aerodynamic drag reducing device for a vehicle, comprising:
   at least one ram air inlet adapted to be mounted to a vehicle, wherein the at least one ram air inlet is positioned in a first direction;
   a flow passage fluidly coupled to the at least one ram air inlet;
   a right side fairing in fluid communication with the flow passage and a left side fairing in fluid communication with the flow passage; and
   at least one blown slot connected to the right side fairing having an outlet and at least one blown slot connected to the left side fairing having an outlet, wherein air enters through the at least one ram air inlet, flows up through the right and left side fairings, and exits the device through the outlet of each of the at least one blown slots connected to the right side fairing and the left side fairing configured to reduce wake and reduce aerodynamic drag for the vehicle.

2. The device of claim 1, wherein each side fairing further includes a hollow core further defining the flow passage and an outer surface, wherein a rear surface of the outer surface is curved to direct airflow in a downward trajectory behind the vehicle.

3. The device of claim 1, wherein the first direction is pointed towards a fore end of the vehicle.

4. The device of claim 1, wherein the at least one blown slot connected to the right side fairing and the at least blown one slot connected to the left side fairing are positioned in a second direction opposite from the first direction.

5. The device of claim 1, wherein the at least one ram air inlet is positioned along a bottom side of an aft end of the vehicle.

6. The device of claim 1, wherein the right side fairing further includes an inlet having an internal passage way connected to the outlet of the at least one blown slot of the right side fairing.

7. The device of claim 1, wherein the left side fairing further includes an inlet having an internal passage way connected to the outlet of the at least one blown slot of the left side fairing.

8. The device of claim 1, further comprising:
   a top fairing in fluid communication with the flow passage; and
   at least one blown slot connected to the top fairing having an outlet, wherein air enters through the at least one ram air inlet into the flow passage, flows through the top fairing, and exits the device through the outlet of the at least one blown slot connected to the top fairing.

9. The device of claim 8, wherein the top fairing further includes a hollow core further defining the flow passage and an outer surface, wherein a rear surface of the outer surface is curved to direct airflow in a downward trajectory behind the vehicle.

10. The device of claim 8, wherein the at least one blown slot connected to the top fairing is positioned in a second direction opposite from the first direction.

11. The device of claim 1, wherein the at least one ram air inlet is located along at least one of a top side of the vehicle, an edge of the right side fairing, an edge of the left side fairing, or an edge of the top fairing.

12. An aerodynamic drag reducing device for a vehicle, comprising:
   at least one ram air inlet adapted to be mounted to a vehicle, wherein the at least one ram air inlet is positioned in a first direction;
   a flow passage fluidly coupled to the at least one ram air inlet;
   a right side fairing in fluid communication with the flow passage and a left side fairing in fluid communication with the one flow passage;
   a top fairing in fluid communication with the flow passage;
   at least one blown slot connected to the right side fairing and having an outlet, wherein air enters the at least one ram air inlet into the flow passage and is directed into the at least one blown slot of the right side fairing and exits the outlet of the blown slot of the right side fairing; and
   at least one blown slot connected to the left side fairing and having an outlet, wherein air enters the at least one ram air inlet into the flow passage and is directed into the at least one blown slot of the left side fairing and exits the outlet of the blown slot of the left side fairing configured to reduce wake and reduce aerodynamic drag for the vehicle.

13. The device of claim 12, wherein the top fairing includes at least one blown slot connected to the top fairing and having an outlet, wherein air enters the at least one ram air inlet into the flow passage and is directed into the at least one blown slot of the top fairing and exits the outlet of the blown slot of the top fairing configured to reduce wake and reduce aerodynamic drag for the vehicle.

14. The device of claim 12, wherein the at least one ram air inlet is positioned along a bottom side of an aft end of the vehicle.

15. The device of claim 12, wherein the at least one ram air inlet includes a plurality of ram air inlets connected to the left and right side fairings and positioned along a bottom side of an aft end of the vehicle, wherein air enters through the plurality of ram air inlets and into the flow passage.

16. The device of claim 12, wherein the left side fairing further includes an inlet connected to the at least one blown slot by an internal flow passage.

17. The device of claim 12, wherein the right side fairing further includes an inlet connected to the at least one blown slot by an internal flow passage.

18. The device of claim 12, wherein each fairing further includes a hollow core further defining the flow passage and an outer surface, wherein a rear surface of the outer surface is curved to direct airflow in a downward trajectory behind the vehicle.

19. The device of claim 12, wherein the at least one ram air inlet is located along at least one of a top side of the vehicle, an edge of the right side fairing, an edge of the left side fairing, or an edge of the top fairing.

20. The device of claim 12, wherein the first direction is pointed towards a fore end of the vehicle.

* * * * *